2,780,555
COATING COMPOSITION

Eugene Paul Budewitz, Homewood, Ill., assignor to The Sherwin-Williams Company, Cleveland, Ohio, a corporation of Ohio No Drawing. Application October 22, 1954,
Serial No. 464,183

5 Claims. (Cl. 106—208)

This invention relates, as indicated, to a novel coating composition and particularly one in which the binder material is soluble in water or aqueous media. Such compositions find applicability in paints, adhesives, paper sizes, etc.

The advantages of water as a solvent material for coating composition binder solids is practically self-evident. The availability, low cost, non-hazardous factors associated with water as a solvent, and the fact that it enables easy clean-up of equipment and tools have prompted much effort directed toward its use in the coatings industry. While much is gained from its use, much is sacrificed in the performance of the final product. Most of the films cast from aqueous solutions remain water sensitive. Difficulty in washing such films is experienced not only because of water sensitivity but also because of poor alkali resistance.

It is a principal object of this invention, therefore, to provide a coating composition in which the binder solids are soluble in water or aqueous media and which, when the solvent has evaporated, sets to a water and alkali resistant mass.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, this invention comprises a composition of matter comprising an ungelled aqueous solution of zirconyl ammonium carbonate and a metal ammonium alginate in which the metal is selected from the group consisting of chromium, manganese, iron, cobalt, nickel, copper, zinc and aluminum.

In the compounding of these coating compositions, numerous ways are available for incorporating the metal alginate into water solution. Most metal alginates, excepting the alkali metal and ammonium salts, are insoluble in water. They are readily solubilized in water or aqueous media by the use of ammonia, ammonium compounds, or amines, e. g., diethylamine, monoethanolamine, etc. For example, reference may be had to Patent No. 1,395,016 as illustrative of one method of incorporating metal alginates into aqueous solution. In the specific examples which follow, various methods of incorporating the metal alginates are illustrated. The amino compounds (water soluble) operate, but do not yield as highly stable a film as ammonia and the inorganic ammonium compounds in a short time.

The second essential ingredient of these compositions is zirconyl ammonium carbonate.

Commercially, zirconyl ammonium carbonate is available as a 27% aqueous solution containing 10% by weight of $ZrO_2$. The solution contains 4.2 moles of $CO_3$ and 4.6 moles of $NH_3$ per mole of $ZrO_2$. Equivalent materials may be formed in situ by reacting a water-soluble zirconium salt, ammonium carbonate and ammonium hydroxide.

Compounding is effected by simple mixing. No heat is required. Agitation should not be so vigorous as to beat air into mass. Entrapped air causes a build-up in viscosity, but normal viscosity is restored on removal of the air. If pigments are to be added to these compositions so as to make a protective or decorative coating composition, it is preferably slurried with water before introduction into the vehicle to expel air.

In general, the ratio of metal alginate to zirconyl ammonium carbonate is from about 1:0.3 to 1:1.7. When ratios above this are used, the cost becomes prohibitive for the amount of increase in film resistance. Higher ratios may be used, therefore, if cost is no factor. A 5% to 15% metal alginate vehicle produces a vehicle which is fluid and permits its use alone or as a binder for a pigment. Usually as the solids content is increased above about 15%, the viscosity increases rapidly until finally it becomes a stiff gel.

The films are tested for washing and alkali resistance in a manner which approximates actual washing conditions, except it is greatly accelerated as to time. A cellulose sponge of the type commonly used by the housewife is saturated with a cleaning compound solution, e. g., a trisodium phosphate compound ("Soilax") in water. This is wrung out to a point where suitable for washing and stroked across the film and then back. This cycle is repeated five times and then the surface allowed to remain wet for 3 minutes. The cycle is repeated another five times followed by a 3 minute wait. This goes on until the film fails or it withstands a total of 25 cycles. If the film goes the full route, it has a high resistance to alkali and washing.

The examples which follow illustrate modes of compounding compositions in accordance herewith and also give test results under the foregoing testing procedure.

Example I

| | Grams |
|---|---|
| Alginic acid | 5 |
| Water | 85 |
| Zinc chloride | 1.7 |
| Ammonium hydroxide | 10 |
| Zirconyl ammonium carbonate (27% Soln. 10% by weight $ZrO_2$) | 30 |

This composition when cast as a film and allowed to dry for 15 days withstood a scrub test using 4% Soilax solution amounting to 50 scrubs. This is the maximum for this particular test and shows extremely good resistance to alkali and water.

Example II

| | Grams |
|---|---|
| Ammonium alginate | 5 |
| Water | 85 |
| Zinc chloride | 1.7 |
| Ammonium hydroxide | 18 |
| Zirconyl ammonium carbonate (27% Soln.) | 30 |

This composition when cast as a film withstood a scrub test using 4% Soilax solution after 4 days of 50 scrubs.

Examples I and II, the zinc chloride is added on an equivalent weight basis calculated to convert the carboxyls of the alginate to zinc ammonium alginate. Ratios of zinc salts lower than the equivalent weight are less effective in promoting water insolubility. A series of compositions was run and it was found that the best results were obtained with these coating compositions when the ratio of zinc alginate to zirconyl ammonium carbonate was from about 1:0.3 to about 1:1.7, respectively. Higher than this ratio, the cost becomes prohibitive for the amount of increase in film resistance. A 5% to 15% zinc alginate vehicle produces a vehicle which is fluid and permits its use alone or as a binder for a pigment. Over 10 to 15% vehicle solids, the viscosity increases rapidly until finally it becomes a stiff gel.

In order to improve the flexibility of the films of the metal alginates, a polyhydric alcohol, e. g., glycerine, was added in an amount equal in weight to the metal alginate. No substantial loss in servability was encountered and the flexibility was improved.

*Example III*

| | Grams |
|---|---|
| Zinc alginate | 5 |
| Water | 95 |
| Ammonium hydroxide | 18 |
| Zirconyl ammonium carbonate (27% Soln.) | 30 |
| Glycerine | 5 |

This composition after 15 days withstood 40 to 50 scrubs of a 4% Soilax solution.

The odor of ammonia was felt to be somewhat objectionable in this example and accordingly a combination of ammonium hydroxide and ammonium carbonate was tried.

*Example IV*

| | | |
|---|---|---|
| Alginic acid | grams | 6 |
| Water | do | 85 |
| Zinc chloride | do | 2 |
| Ammonium hydroxide | cc | 7 |
| 20% ammonium carbonate solution | cc | 10 |
| Zirconyl ammonium carbonate (27% Soln.) | grams | 12.5 |

When cast as a film, this composition after 15 days withstood 50 scrubs of a 4% Soilax solution.

*Example V*

The following example is illustrative of a pigmented composition.

| | Lbs. |
|---|---|
| Zinc alginate | 34.7 |
| Water | 500 |
| Aqueous ammonia (28%) | 27.4 |
| Zirconyl ammonium carbonate (27% Soln.) | 52 |
| Mica | 173.5 |
| Water | 203 |

This composition had a viscosity of 16 seconds on the SW No. 4 cup at 77° F. The total quantity produced was 100 gallons, having a weight per gallon of 9.69 lbs. The non-volatile matter was 23.6% (calculated). This material had a washability after 3 days of 50 rubs with a 4% Soilax solution.

*Example VI*

| | Grams |
|---|---|
| Alginic acid | 5 |
| Water | 200 |
| Cobalt chloride | 2 |
| Ammonium hydroxide | 18 |
| Zirconyl ammonium carbonate (27% Soln.) | 40 |

Example VI withstood 40 scrubs after 15 days.

*Example VII*

| | Grams |
|---|---|
| Alginic acid | 5 |
| Water | 95 |
| Cupric chloride | 1.7 |
| Ammonium hydroxide | 5 |
| Zirconyl ammonium carbonate (27% Soln.) | 7 |

Example VII withstood 50 scrubs with 4% Soilax after 15 days.

*Example VIII*

| | Grams |
|---|---|
| Zinc alginate | 5 |
| Water | 95 |
| Ethylene diamine | 6 |
| Zirconyl ammonium carbonate (27% Soln.) | 10 |

On washing with Soilax (4% solution) this product withstood after 15 days 25–30 scrubs.

The following table shows an interesting comparison of a blank, a metal alginate-containing composition without the zirconyl ammonium carbonate and with the zirconyl compound.

| | A | B | C |
|---|---|---|---|
| Ammonium alginate g | 3.5 | | |
| Zinc alginate g | | 3.5 | 3.5 |
| Water g | 100.0 | 100.0 | 100.0 |
| Ammonium hydroxide g | | 3.0 | 3.0 |
| Zirconyl ammonium carbonate (27% Soln.) g | | | 5.3 |
| No. scrubs 4% Soilax (4 days) | 0 | 5–7 | 50 |

Composition A washes off as the ammonium alginate film is water soluble. Zinc alginate is insoluble in water, but the alkali destroys the film. The complete composition is stable to the alkali.

As indicated above, other materials may be included in the compositions of this invention to confer other properties thereon. Pigments, fillers and extenders may be incorporated by usual means.

I claim:
1. A composition of matter comprising an ungelled aqueous solution of zirconyl ammonium carbonate and a metal ammonium alginate in which the metal is selected from the group consisting of chromium, manganese, iron, cobalt, nickel, copper and zinc.
2. A composition of matter comprising an ungelled aqueous solution of zirconyl ammonium carbonate and zinc ammonium alginate.
3. A composition of matter comprising an aqueous solution of zirconyl ammonium carbonate and zinc ammonium alginate, the ratio by weight of zirconyl ammonium carbonate to zinc ammonium alginate being within the range of from about 0.3:1 to about 1.7:1, said composition containing from 5% to 15% binder solids by weight.
4. A composition in accordance with claim 1 which contains about 3% by weight of glycerine.
5. A composition of matter suitable for use as a coating composition containing the following ingredients in approximately the amounts indicated.

| | Lbs. |
|---|---|
| Zinc alginate | 34.7 |
| Water | 500 |
| Aqueous NH₃ (28%) | 27.4 |
| Zirconyl ammonium carbonate (27% Soln.) | 52 |
| Mica | 173.2 |
| Water | 203 |

No references cited.